(12) United States Patent
Jacobson et al.

(10) Patent No.: US 9,391,773 B2
(45) Date of Patent: Jul. 12, 2016

(54) ELLIPTIC CURVE POINT MULTIPLICATION PROCEDURE RESISTANT TO SIDE-CHANNEL INFORMATION LEAKAGE

(71) Applicant: QUALCOMM Incorporated, San Diego, CA (US)

(72) Inventors: David Merrill Jacobson, San Diego, CA (US); Billy Bob Brumley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/245,732

(22) Filed: Apr. 4, 2014

(65) Prior Publication Data

US 2015/0288520 A1   Oct. 8, 2015

(51) Int. Cl.
*H04L 9/30* (2006.01)
*G06F 7/72* (2006.01)
*H04L 9/00* (2006.01)

(52) U.S. Cl.
CPC .............. *H04L 9/3066* (2013.01); *G06F 7/725* (2013.01); *H04L 9/003* (2013.01); *G06F 2207/7257* (2013.01); *H04L 2209/24* (2013.01); *H04L 2209/72* (2013.01)

(58) Field of Classification Search
CPC combination set(s) only.
See application file for complete search history.

(56) References Cited

U.S. PATENT DOCUMENTS

| | | | |
|---|---|---|---|
| 6,738,478 B1 | 5/2004 | Vanstone et al. | |
| 7,991,162 B2 | 8/2011 | Longa et al. | |
| 8,615,080 B2 | 12/2013 | Ebeid | |
| 2005/0195973 A1 | 9/2005 | Ibrahim | |
| 2008/0219450 A1* | 9/2008 | Ebeid | G06F 7/725 380/277 |
| 2008/0275932 A1* | 11/2008 | Ebeid | G06F 7/725 708/620 |
| 2009/0046851 A1* | 2/2009 | Elmegaard-Fessel | G06F 7/725 380/28 |
| 2009/0074178 A1* | 3/2009 | Longa | G06F 7/725 380/28 |
| 2009/0214025 A1 | 8/2009 | Golic | |
| 2014/0098951 A1* | 4/2014 | Choi | H04L 9/003 380/28 |

OTHER PUBLICATIONS

Coron, J.S., "Resistance Against Differential Power Analysis for Elliptic Curve Cryptosystems" In: "Lecture Notes in Computer Science", Jan. 1, 1999, Springer Berlin Heidelberg, Berlin, Heidelberg, XP055139243, ISSN: 0302-9743 ISBN: 978-3-54-045234-8 vol. 1717, pp. 292-302, DOI: 10.1 007/3-540-48059-5_25.

Feng M., et al., "Efficient Comb Elliptic Curve Multiplication Methods Resistant to Power Analysis", International Association for Cryptologic Research, vol. 20050712:201114, Jul. 8, 2005, pp. 1-31, XP061001360.

(Continued)

*Primary Examiner* — Beemnet Dada
(74) *Attorney, Agent, or Firm* — Loza & Loza, LLP

(57) ABSTRACT

One feature pertains to elliptic curve (EC) point multiplication for use in generating digital signatures. In one aspect, a scalar multiplier (k) of a base point (P) of order (n) is selected on an elliptic curve for use with EC point multiplication. An integer value (r) is then randomly generated from within a range of values constrained so that, regardless of the particular value of (r) obtained within the range, EC point multiplication procedures performed using the scalar multiplier (k) summed with a product of the integer multiplier (r) and the order (n) consume device resources independent of the value of the scalar multiplier (k) to thereby reduce or eliminate side-channel leakage. This may be achieved by determining the range of values for r so that the bit position of the most significant bit of k+(r*n) will be even and fixed for a particular elliptic curve.

32 Claims, 11 Drawing Sheets

(56) References Cited

OTHER PUBLICATIONS

International Search Report and Written Opinion—PCT/US2015/023683—ISA/EPO—Jul. 17, 2015.
Jove M., et al., "Exponent Receding and Regular Exponentiation Algorithms", Jun. 21, 2009, Progress in Cryptology—AFRICACRYPT 2009, Springer Berlin Heidelberg, Berlin, Heidelberg, pp. 334-349, XP019119767, ISBN: 978-3-642-02383-5.
Mohamed N.A.F., et al., "Improved Fixed-Base Comb Method for Fast Scalar Multiplication", Jul. 10, 2012, Lecture Notes in Computer Science, Progress in Cryptology—AFRICACRYPT 2012, Springer Berlin Heidelberg, Berlin, Heidelberg, vol. 7374, 2012, pp. 342-359, XP047008428, ISBN: 978-3-642-31409-4.
Moller B., "Securing Elliptic Curve Point Multiplication against SideChannel Attacks", Information Security—ISC 2001, LNCS 2200, Jan. 1, 2001, pp. 324-334, XP055201332.

\* cited by examiner

ELLIPTIC CURVE POINT MULTIPLICATION PROCEDURE RESISTANT TO SIDE-CHANNEL INFORMATION LEAKAGE

BACKGROUND

1. Field

Various features relate to elliptic curve cryptography, particularly elliptic curve point multiplication procedures for use in generating digital signatures or the like.

2. Background

Elliptic curve (EC) point multiplication is a procedure used within EC cryptography that accepts a multiplier, k (sometimes called d), which is meant to be kept secret. EC point multiplication may be used, for example, as part of a procedure to create digital signatures for use in securing on-line transactions. Various techniques can be used by an attacker to obtain information pertaining to the secret multiplier k by exploiting side-channel leakage. For example, the amount of power consumed by a device performing EC point multiplication or the amount of time spent by the device performing the operations can potentially reveal information about k. In particular, problems can arise with conventional EC point multiplication procedures because certain operations involving zero consume less resources than those employing other values, resulting in possible leakage of information pertaining to k. One technique for addressing such leakage is to add a random multiple of n (where n is the order of the base point) to k. That is, $k+(r*n)$ is employed rather than just k, where r is a random number. However, this technique does not ensure that operations involving zero will consume the same amount of time as operations on other values, and hence information leakage can still occur.

Therefore, there is a need to provide improved EC point multiplication procedures for use in generating digital signatures or for other purposes.

SUMMARY

A method for elliptic curve point multiplication operable by a device includes: obtaining a scalar multiplier (k) of a base point (P) of order (n) on an elliptic curve for use with an elliptic curve point multiplication procedure operating on values represented as a series of bits; determining a range of values for an integer multiplier (r) so that, regardless of a particular value of (r) obtained within the range of values, elliptic curve point multiplication procedures performed using the scalar multiplier (k) summed with a product of the integer multiplier (r) and the order (n) consume device resources independent of the value of the scalar multiplier (k); obtaining an integer multiplier (r) from within the range of values; and performing at least one elliptic curve point multiplication procedure using the scalar multiplier (k), the integer multiplier (r) and the order (n).

In another aspect, a device includes a processing circuit configured to: obtain a scalar multiplier (k) of a base point (P) of order (n) on an elliptic curve for use with an elliptic curve point multiplication procedure operating on values represented as a series of bits; determine a range of values for an integer multiplier (r) so that, regardless of a particular value of (r) obtained within the range of values, elliptic curve point multiplication procedures performed using the scalar multiplier (k) summed with a product of the integer multiplier (r) and the order (n) consume device resources independent of the value of the scalar multiplier (k); obtain an integer multiplier (r) from within the range of values; and perform at least one elliptic curve point multiplication procedure using the scalar multiplier (k), the integer multiplier (r) and the order (n).

In yet another aspect, a device includes: means for obtaining a scalar multiplier (k) of a base point (P) of order (n) on an elliptic curve for use with an elliptic curve point multiplication procedure operating on values represented as a series of bits; means for determining a range of values for an integer multiplier (r) so that, regardless of a particular value of (r) obtained within the range of values, elliptic curve point multiplication procedures performed using the scalar multiplier (k) summed with a product of the integer multiplier (r) and the order (n) consume device resources independent of the value of the scalar multiplier (k); means for obtaining an integer multiplier (r) from within the range of values; and means for performing at least one elliptic curve point multiplication procedure using the scalar multiplier (k), the integer multiplier (r) and the order (n).

In still yet another aspect, a machine-readable storage medium has one or more instructions which when executed by at least one processing circuit causes the at least one processing circuit to: obtain a scalar multiplier (k) of a base point (P) of order (n) on an elliptic curve for use with an elliptic curve point multiplication procedure operating on values represented as a series of bits; determine a range of values for an integer multiplier (r) so that, regardless of a particular value of (r) obtained within the range of values, elliptic curve point multiplication procedures performed using the scalar multiplier (k) summed with a product of the integer multiplier (r) and the order (n) consume device resources independent of the value of the scalar multiplier (k); obtain an integer multiplier (r) from within the range of values; and perform at least one elliptic curve point multiplication procedure using the scalar multiplier (k), the integer multiplier (r) and the order (n).

DETAILED DESCRIPTION

Figure 1:
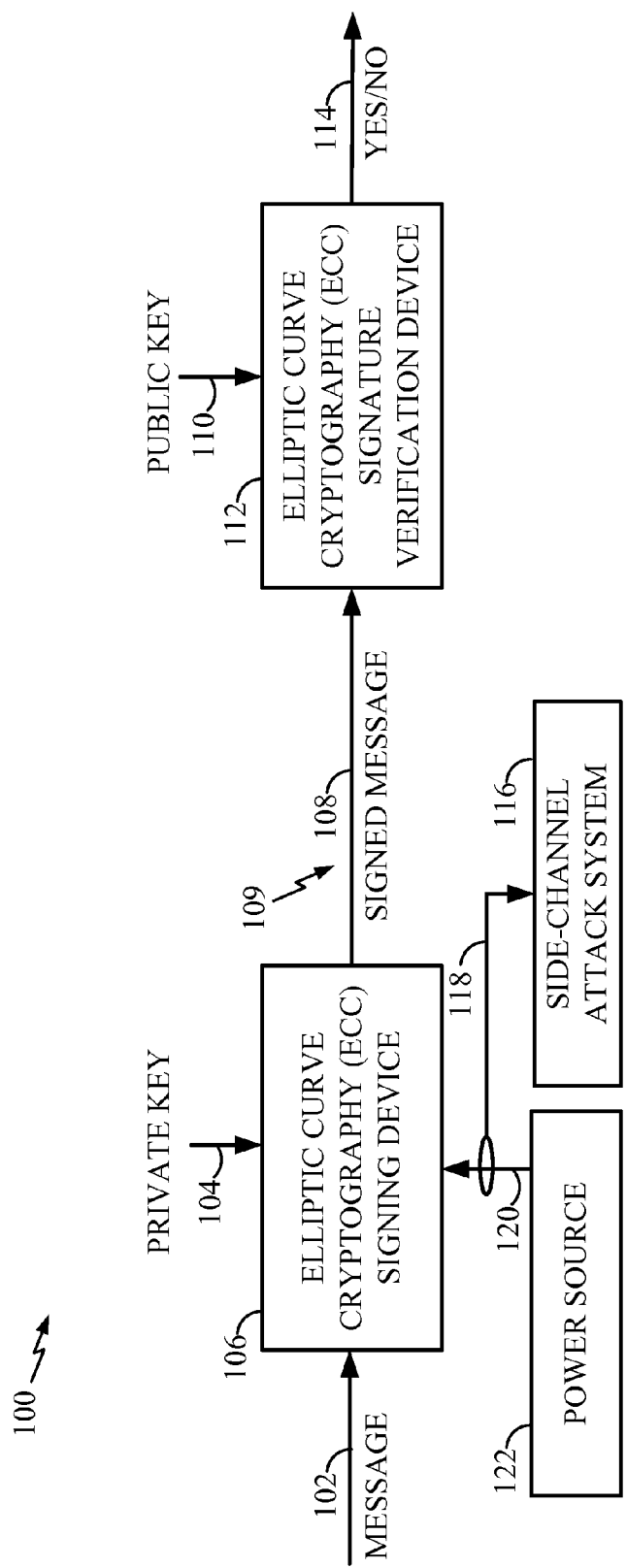
FIG. 1 illustrates an exemplary elliptic curve cryptography (ECC) system subject to a side-channel attack.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to devices and methods for use with elliptic curve (EC) point multiplication and EC cryptography (ECC.) The novel features may be used in devices for use in generating, processing or verifying digital signatures, but are applicable in a wide range of systems, apparatus and devices and to achieve a variety of goals.

In one aspect, a scalar multiplier (k) of a base point (P) of order (n) is selected on an elliptic curve for use with an EC point multiplication procedure operating on values represented as a series of bits. A integer multiplier (r) is then randomly or pseudorandomly generated from within a range of values constrained so that, regardless of the particular value of (r) obtained within the range, EC point multiplication procedures performed using k+(r*n) will consume device resources independent of the value of the scalar multiplier (k), i.e. time and power consumption will be uniform. This may be achieved by specifying a range of values for r so that, regardless of the particular value of r obtained within the range, the bit position of the most significant bit of k'=k+(r*n) will be even and fixed for a particular elliptic curve during EC point multiplication procedures. The range of values for r may be specified by: determining a lower end ($R_L$) of the range of values based on $R_L$=floor(mrecip*$2^{(j-m-1)}$+1) wherein mrecip is an approximate reciprocal of a modulus of the EC point multiplication procedure (where, in the examples herein, the modulus is the order (n) of the base point), m is a number of bits in a value representing the order n, and j is a number of bits in a value representing k; and then determining an upper end ($R_U$) of the range of values based on $R_U$=floor (mrecip*$2^{(j-m)}$-2). The integer multiplier r is then obtained from within this range by, for example, selecting a value within the range randomly or pseudorandomly. (Note that the value r is referred to herein as an "integer multiplier" to distinguish it from the scalar multiplier k. Other terms or symbols can instead be used.)

Since the sequence of basic operations ("double" and "add") of EC point multiplication is fixed in these examples (and is applied for a fixed number of cycles for any particular ECC curve), the foregoing procedure renders simple power analysis and timing attacks quite difficult. Simple power analysis might be combined with signal averaging to extract more information, but this is frustrated by almost every trace having a different k' value. It is noted that in some ECC procedures, introducing a random value can facilitate differential power analysis but that is doubtful here since an attacker would not know r.

Exemplary Hardware Environment and Procedures

FIG. 1 illustrates an exemplary ECC system 100 subject to a side-channel attack. Briefly, a message 102 is processed by an ECC signing device 106, which may employ EC curve multiplication procedures using a private key 104. The signed message 108 is then transferred over a generally unsecured channel 109 where it is processed by an ECC signature verification device 112 using a public key 110 to yield a YES/NO verification 114. Such systems can be vulnerable to a side-channel attack device or system 116, which monitors power and timing information 118 associated with ECC signing device 106, such as by monitoring power signals 120 provided by a power source 122 to obtain power signatures and timing information. If the ECC procedures employed by signing device 106 are vulnerable to side-channel attacks (i.e. the ECC signing device leaks information), the private key may be obtained by an attacker or other malicious entity (e.g. a hacker.)

Figure 2:
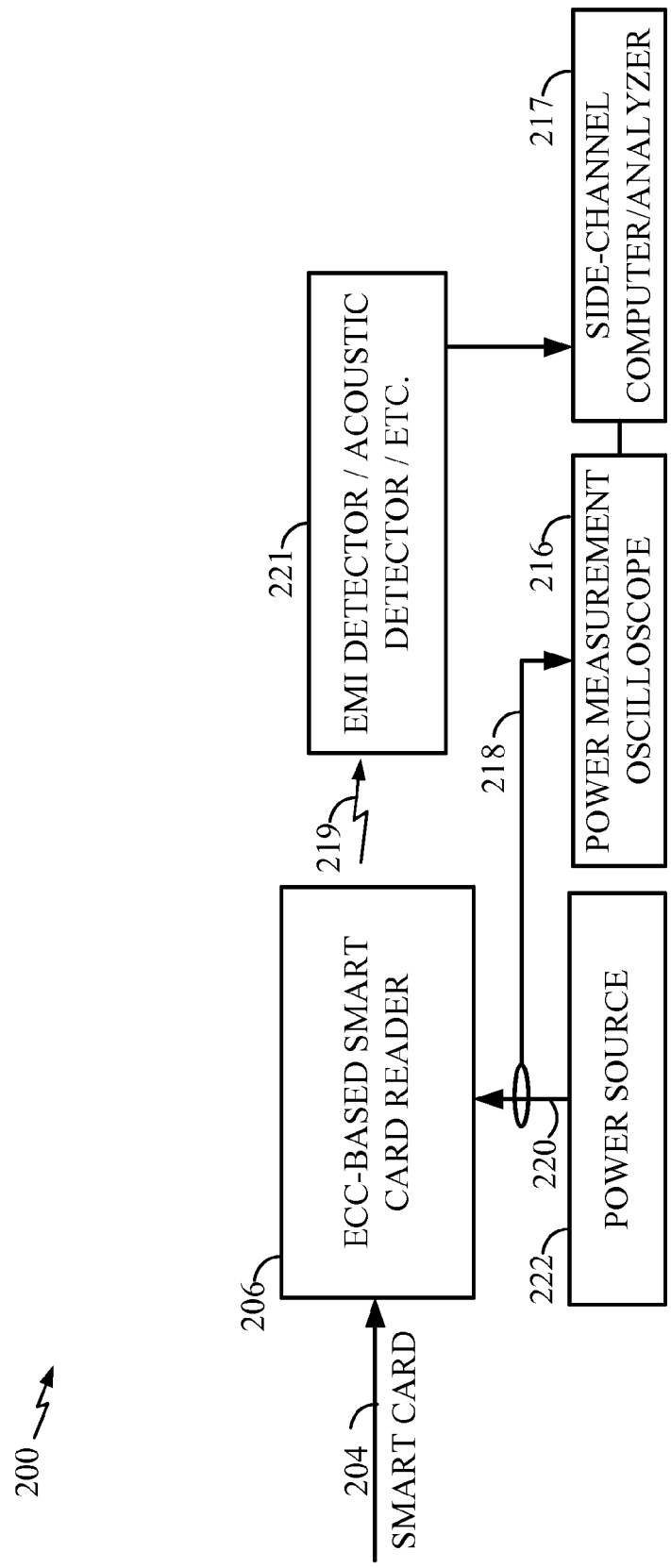
FIG. 2 illustrates another exemplary ECC system subject to a side-channel attack where the system includes an ECC-based smart card reader.

FIG. 2 illustrates another exemplary ECC system 200 subject to a side-channel attack, wherein the system under attack is an ECC-based smart card reader 206 receiving one or more smart cards 204. Again, power and timing information 218 may be obtained from power signals 220 provided by a power source 222 for analysis by a side-channel attack system, which in this example includes a power measurement oscilloscope 216 and a side-channel computer/analyzer 217. Still further, in this example, electromagnetic induction (EMI) signals, acoustic signals, etc., 219 may be obtained by a suitable sensor or detector 221 for analysis by computer/analyzer 217. Similar attacks may be mounted against universal serial bus (USB) devices, smartphones, etc.

Side-channel attacks such as those shown in FIGS. 1 and 2 are enabled in part by vulnerabilities in EC point multiplication procedures employed by ECC systems. Generally speaking, EC point multiplication pertains to procedures for the repeated scalar addition of a point along an elliptic curve and may be employed in ECC to, for example, produce trapdoor functions, i.e. functions that can be easily computed in one direction, yet are difficult to compute in the opposite direction without one or more secret keys or other types of special information. EC point multiplication may be employed in the generation and processing of digital signatures, such as signatures generated in accordance with EC Digital Signature Algorithm (ECDSA) and exploited by systems such as those of FIGS. 1 and 2. For further information see, for example, American National Standard X9.62-2005, *Public Key Cryptography for the Financial Services Industry, The Elliptic Curve Digital Signature Algorithm (ECDSA)*, Nov. 16, 2005.

More specifically, ECC is a type of public-key cryptography based on elliptic curves over finite fields. In this regard, an elliptic curve may be associated with a set of points P=(x,y) that satisfy an equation $y^2=x^3+ax+b$, where a and b are constant values (satisfying certain conditions) along with a "point at infinity." EC point multiplication of a point P by a number k may be defined or represented as the result of adding point P to itself k times, i.e. kP=P+P+ . . . +P. With sufficiently large values for k and n, this form of scalar multiplication serves as a cryptographic process for use in signing and verifying data, i.e. generating digital signatures, etc. In this regard, EC point multiplication exploits the apparent intractability of determining k from Q=kP given known values of Q and P (where, in the literature, P is sometimes called the generator and denoted by G.) Given this intractability, the value kP may be used as a public key; whereas k may be used as a private key.

To perform point multiplication, ECC may employ point addition and point doubling. Briefly, point addition or "add" involves taking two points along a projective version of the elliptic curve and determining an intersection point where a line through the two points intersects the curve at yet another location on the curve. The negative of the intersection point represents the result of the addition. Point doubling or "double" is similar to point addition, except the tangent at a single point on the projective elliptic curve is exploited to provide a tangent line, which then intersects with the curve at another location on the curve. Point multiplication may be performed by using point addition and point doubling as needed such as by implementing a "double and add."

Hence, EC point multiplication can be regarded as a calculation or process that accepts a multiplier k and a base point P. It is typically implemented by representing the value of k as a sequence of bits (e.g. a binary value, bit string or binary vector) such that, when interpreted as a binary number, the value is equal to the multiplier. In this regard, a variable Z may be initially set to the additive identity, which for elliptic curves is the aforementioned the point at infinity, or initially set to other appropriate values such as a value determined by a first bit pair. (Note that Z is a actually a tuple with an x and y coordinate that are large integers.) Z may then be reset or modified based on the bits of the multiplier k. This may be performed by examining k from most significant bit to the least significant bit. For a given bit, if it is a 0, then Z:=2Z. If it is a 1, then Z:=2Z+P. When all of the bits of k have been processed, the then current value of Z represents the result. Typically, the multiplier k is the secret value meant to be kept protected from hackers or other malicious entities. As noted, there are several side-channel mechanisms by which information about the computation, as well as the secret key k, can leak.

Insofar as the aforementioned point doubling and point addition are concerned, the case where a bit of k is a 0 results in only a double operation. The case where a bit of k is a 1 results in a double and an add. So the number of adds is equal to the number of 1 bits in k. The add operations take time to perform within a processing system and so information regarding the duration and timing of operations can reveal the number of 1 bits in k using, e.g., the side-channel attach systems of FIGS. 1 and 2. Moreover, the double and add operations usually take different amounts of power to perform within a processing system and so observing power usage (e.g. on an oscilloscope) can directly reveal every bit of k. Cryptographic techniques have been developed to make the number of adds constant but even with this precaution the power consumed may depend on the number of 1 bits in the machine level instructions. If the computation is repeated many times, it may be possible to extract information about k, i.e. side-channel leakage of information can still occur.

Figure 3:
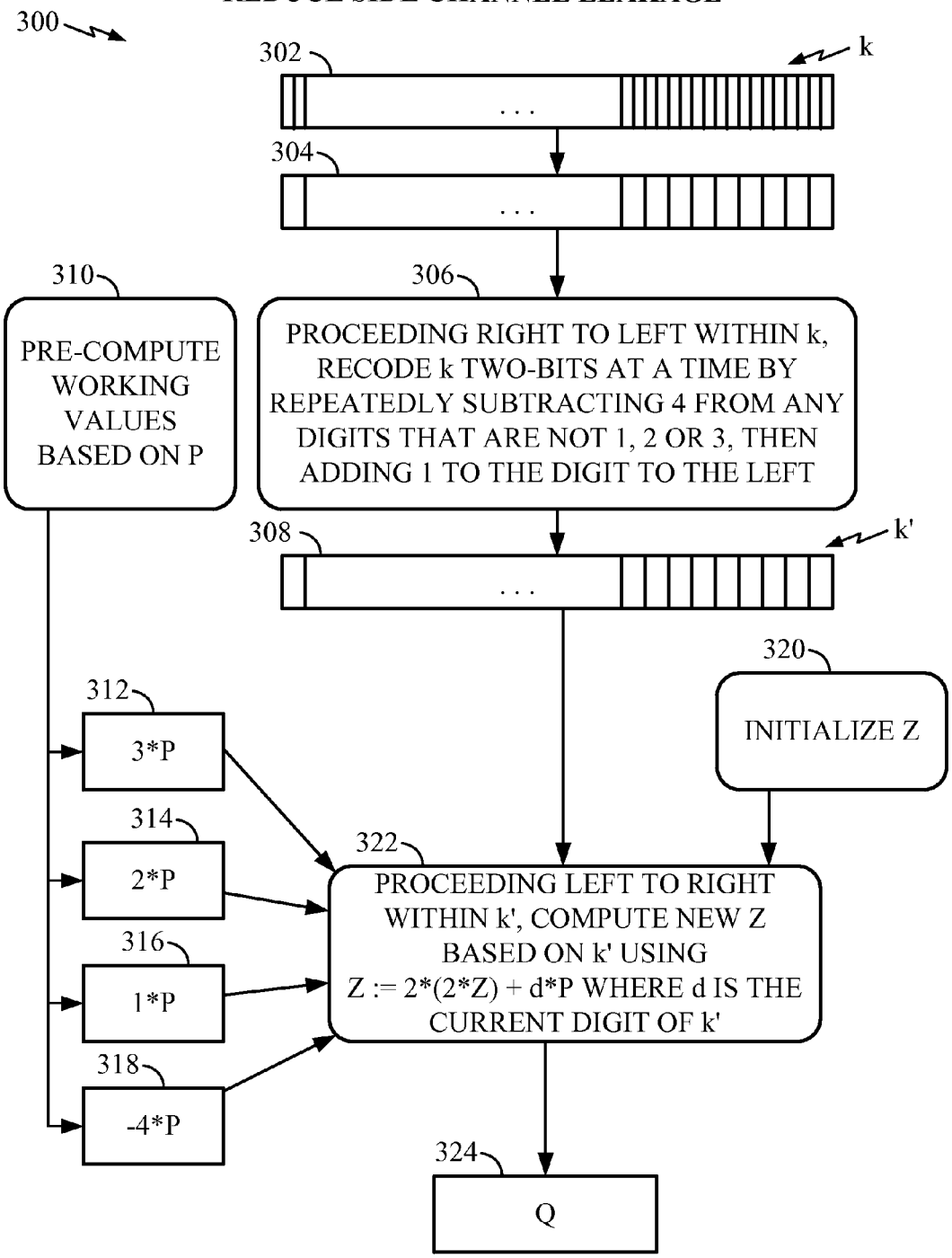
FIG. 3 illustrates an exemplary recoding procedure for use with EC point multiplication that is vulnerable to side-channel attacks.

FIG. 3 illustrates one technique for addressing at least some of these problems wherein the multiplier is recoded to reduce leakage. An illustrative example 300 of recoding is shown, which operates to group the bits of the multiplier k "two at time" to yield what may be regarded as a base 4 representation of k. In the example, an input string k 302, which may be a binary series or binary vector, is grouped two at time to yield a "base 4" string 304. Note that for clarity this grouping is shown by way of a separate "base 4" string 304 in the figure, but it should be understood that a separate string need not be computed or stored. Subsequent operations can operate directly on binary string 302 by simply taking the bits two at a time. Moreover, in the following examples, for simplicity, each 2-bit pair is regarded as a digit. At step 306, proceeding right to left within string k, the processing system recodes k two-bits at a time by repeatedly subtracting 4 from any digits that are not 1, 2 or 3, and then adding 1 to the digit to the left. That is, if the 2-bit digit is 1, 2, or 3, it is left alone during the recoding. If the 2-bit digit is not 1, 2, or 3, then 4 is repeatedly subtracted from the current digit and 1 is added to the digit to the left (creating a new digit if necessary) until the current digit is −4, 1, 2, or 3. The result in a recoded version of k, referred to as k' in the figure.

The processing system also pre-computes four working values: 3*P, 2*P, 1*P, −4*P, based on the base point P, which are stored as values 312, 314, 316 and 318, respectively. The system at 320 also initializes Z to a value determined by a first bit pair. Then, at 322, proceeding left to right within k', the processing system computes new values for Z based on k' using Z:=2*(2*Z)+d*P where d is the current digit of k'. That is, processing proceeds from left to right one digit at a time within k'. If the current digit's value is d (and recalling that d will be −4, 1, 2 or 3 but not 0), the processing system computes a new value by using the pre-computed values for d*P (i.e., 3*P, 2*P, 1*P and −4*P.) The final string is denoted Q, 324. This recoding procedure causes every digit of Q to be associated with two doubles and one addition, which then makes it hard for an attacker to directly read off the digits from a power trace where doubles and additions appear different to one another. Although this procedure is helpful in reducing side-channel leakage, room for improvement remains since an extra digit sometimes needs to be created when k' is generated, and thus the timing of the procedure (e.g. its duration) can leak information that a malicious entity might exploit. Moreover, this procedure does not hinder statistical attacks that depend on the number of zeroes and ones in the step-by-step operations.

Figure 4:
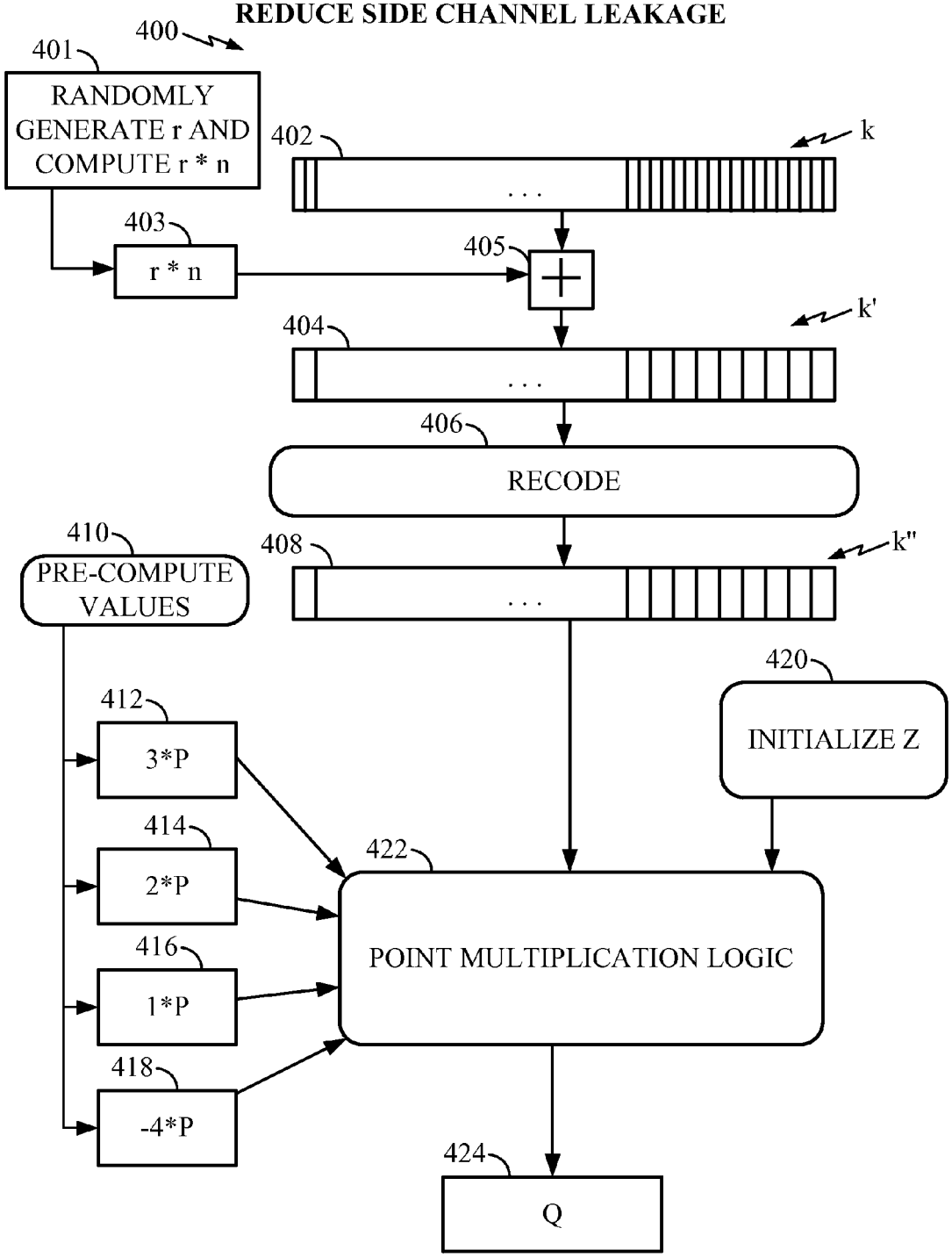
FIG. 4 illustrates another exemplary recoding procedure for use with EC point multiplication that is vulnerable to side-channel attacks.

FIG. 4 illustrates another technique for reducing leakage. The technique 400 of FIG. 4 involves adding a random multiple of n, the order of the base point, to k to yield k'=k+r*n, where r is a random number. That is, at 401, the processing system randomly generates a value r and then pre-computes a binary string value 403 representative of r*n. Input string 402 corresponds to bit string k. The values for k and r*n are then added at block 405 to yield a string k'=k+r*n, which may again be regarded as a base 4 string by grouping pairs of bits, as shown. Thereafter, processing may proceed as generally described in connection with FIG. 3 with string k' 404 recoded to yield a new string k" 408, which is then used to generate the Q value 424 from the initialized Z value 420 using point multiplication logic 422 based on values pre-computed using P at 410 and stored at blocks 412, 414, 416 and 418. The technique of FIG. 4 can typically thwart attacks based on extracting k from noise because, for any reasonable number of samples, the same k' will have occurred only a few times (since it incorporates a random component r.) However, as with the recoding technique discussed above with reference to FIG. 3, the procedure of FIG. 4 does not ensure that instances with the same size k will run in the same time since recoding may add an extra digit to k".

Figure 5:
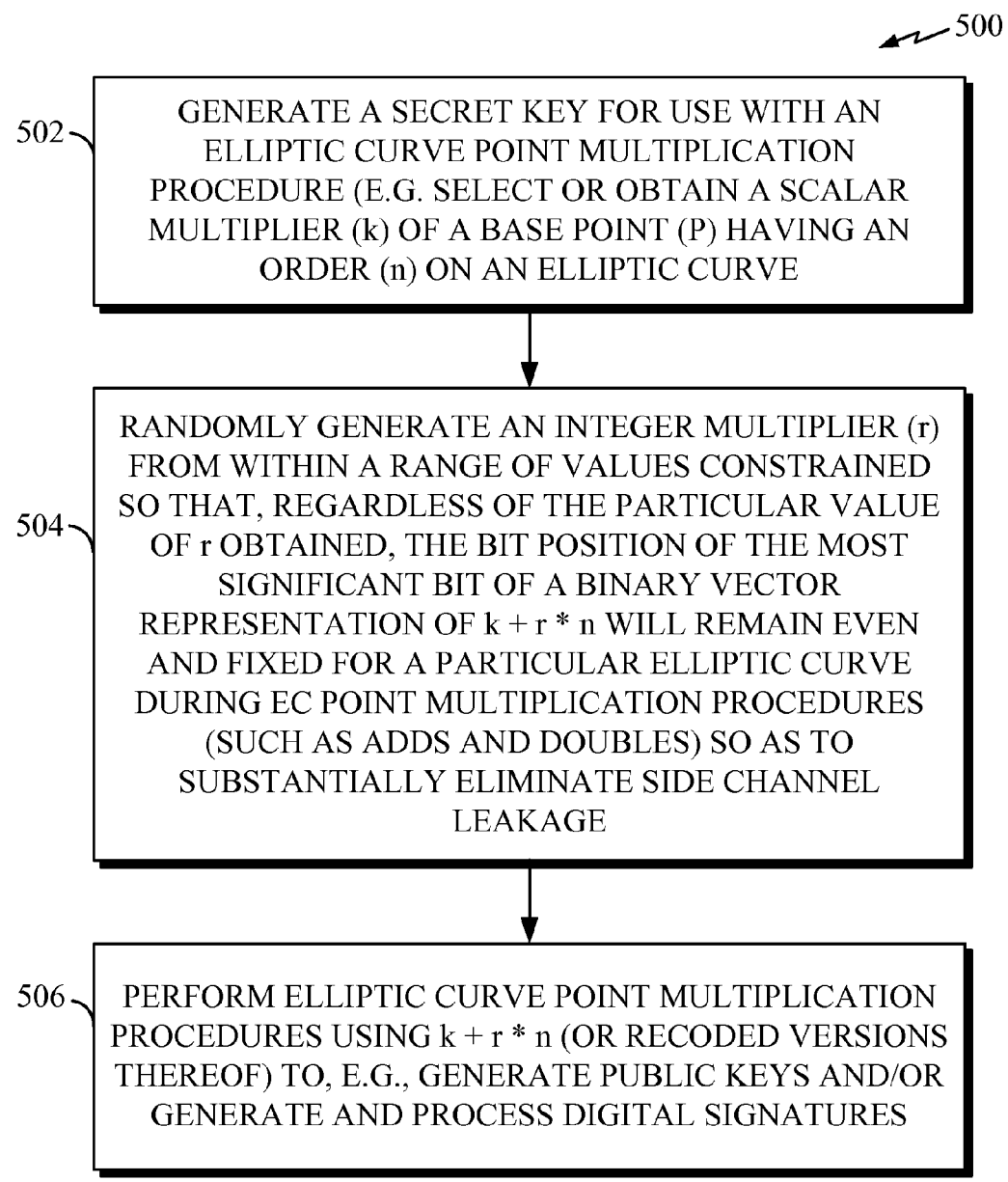
FIG. 5 provides an overview of an exemplary procedure for use with EC point multiplication that substantially eliminates certain kinds of side-channel attacks.

FIG. 5 provides an overview of technique operable by an ECC device for substantially reducing or eliminating the forms of leakage that afflict the procedures of FIGS. 3 and 4. The recoding technique 500 of FIG. 5 also involves adding a random multiple of n, the order of the base point, to k but the random multiple r is constrained to a range of values such that, regardless of the particular value of r obtained, the bit position of the most significant bit of a binary series representation of k+r*n will remain even and fixed for a particular elliptic curve during EC point multiplication procedures so as to consume device resources independent of the value of the scalar multiplier (k), i.e. time and power consumption will be uniform regardless of k. That is, at step 502, an ECC processing system generates or otherwise obtains or acquires a secret key for use with an EC point multiplication procedure by, e.g., selecting a scalar multiplier (k) of a base point (P) having an order (n) on an elliptic curve. Note that, herein, "obtaining" broadly covers, e.g., generating, acquiring, receiving, retrieving or performing any other suitable corresponding actions. At step 504, the processing system randomly generates a integer multiplier r from within the constrained range of values so that, as noted, the bit position of the most significant bit of a vector representation of k+r*n will remain even and fixed for a particular elliptic curve during EC point multiplication procedures (such as adds and doubles) so as to substantially eliminate side channel leakage that might otherwise occur. At step 506, the processing system then performs EC point multiplication procedures using k+r*n (or recoded versions thereof) to, e.g., generate public keys and/or generate and process digital signatures employing such keys.

The exemplary processing technique of FIG. 5 provides for a substantially constant running time whereby the sequence of doubles and adds is constant. With this technique, even if an attacker is successful in causing the victim to repeat the same EC point multiplication computation many times, each instance of the computation uses a different k' (i.e. k+r*n or recoded versions thereof) with high probability, thus making statistical attacks more difficult. In this regard, first note that if a fixed position, m, of the most significant bit (of the un-recoded k) is even where the least significant bit is numbered zero (or equivalently in the usual terminology, the multiplier has an odd number of bits), the recoding procedure always generates m/2 digits. An important aspect of the procedure of FIG. 5 is to generate the random value, r, so that the bit position of the most significant bit of k'=k+r*n is always even and fixed for a particular elliptic curve (assuming k<n.) As such, the sequence of double and add operations will not depend on k. Moreover, there are a very large number of possible values of k' and, since an attacker will not know r, it will be quite hard for the attacker to mount a statistical attack to extract signal from noise.

For clarity and brevity in describing the procedure, the descriptions herein below will ignore the fact that the "big numbers" of ECC are represented in words and that computer arithmetic works on words. With that proviso in mind, in cryptographic systems that use bignum arithmetic, there are many aspects associated with the modulus (i.e. the order of the base point): its length in bits, some special values for Montgomery multiplication, etc. In practice, these are generally computed in advance and put in a data structure associated with the modulus involved. An additional value can be added to this set of pre-computed values: an approximate word-sized reciprocal of the modulus when the binary point is just left of the left-most bit. This value will be between 1 and 2, inclusive. (Note that the exact reciprocal, as defined here, cannot be equal to 1 but it can be sufficiently close so that, when rounded to a word, the value rounds to an exact 1.) Herein, this approximate reciprocal of the modulus is referred to herein as: "mrecip." For simplicity of explanation, the descriptions herein treat mrecip as though it were a floating point value, but one skilled in the art can use an integer along with scaling information to represent the value. Herein, m is the number of bits in a binary value or vector representing n. Thus, n*mrecip is approximately equal to $2^m$.

The number of bits in k' (and hence in the recoded multiplier) will be j (where j must be odd) so long as $2^{(j-1)}$<=k+r*n<=-1. This inequality will be necessarily true if the slightly stronger inequality $2^{(j-1)}$<=r*n<$2^j$-n is likewise true, since k<n. Multiplying all terms by mrecip*$2^{-m}$ yields mrecip*$2^{-m}$*$2^{(j-1)}$<=mrecip*$2^{-m}$*r*n<mrecip*$2^{-m}$*$2^j$-mrecip*$2^{-m}$*n. Note that n*mrecip*$2^{-m}$ is approximately 1, and simplifying, one obtains mrecip*$2^{(j-m-1)}$<=r<mrecip*$2^{(j-m)}$-1. In practice, there will be some rounding error and so, for safety, the r is selected randomly (or pseudorandomly) in the slightly narrower range: floor(mrecip*$2^{(j-m-1)}$)+1 . . . floor(mrecip*$2^{(j-m)}$)-2 (where floor(x) is a function representing the largest integer not greater than x.) For example, if k' has 24 more bits than n, then j−m−1 is 23 and j−m is 24. So, even if mrecip is close to 1, r will be roughly between $2^{23}$ and $2^{24}$, and there will be about eight million possible r values so the same r value will occur only very rarely.

Figure 6:
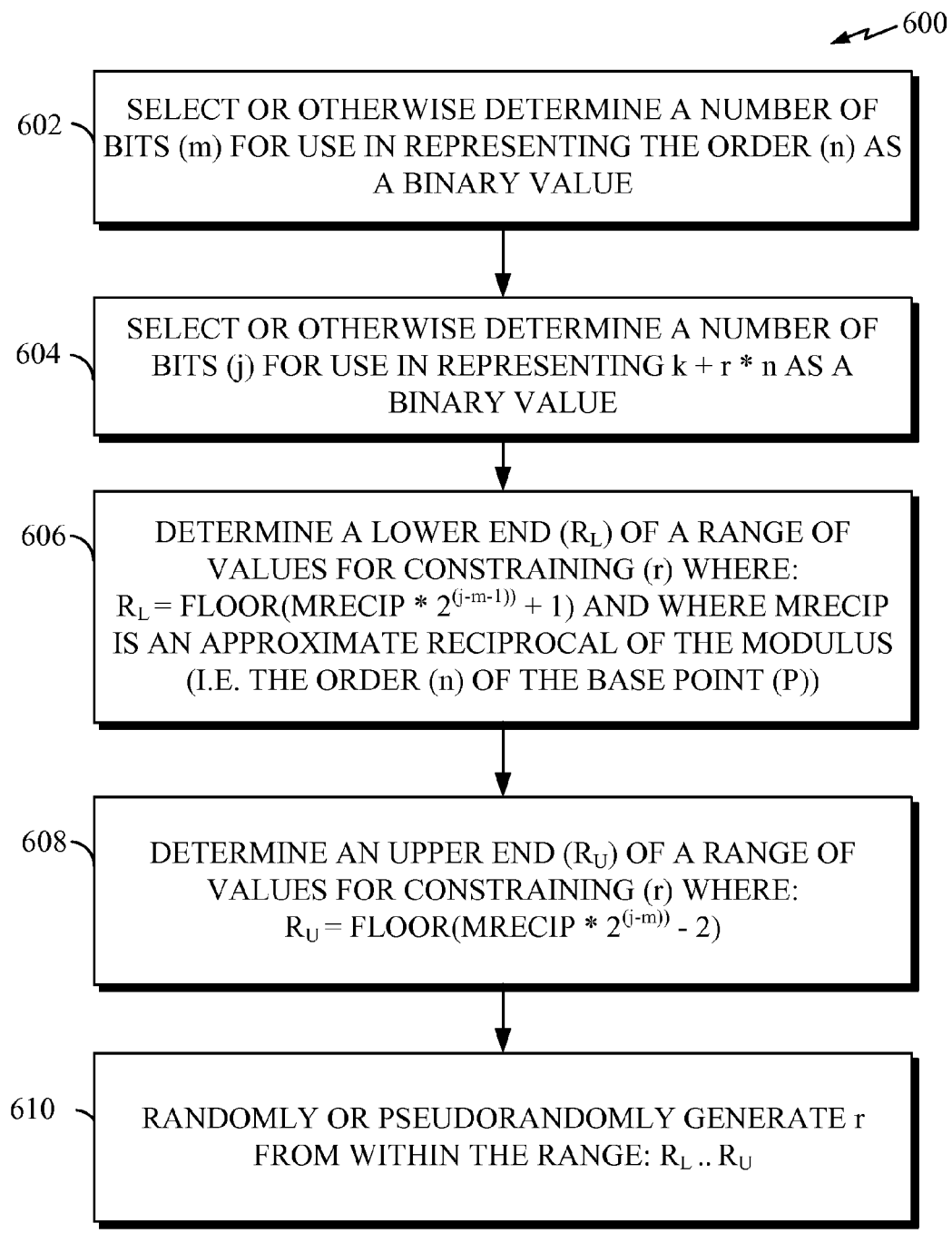
FIG. 6 further illustrates aspects of the exemplary procedure of FIG. 5.

Accordingly, as shown in FIG. 6, an illustrative procedure for obtaining the integer multiplier (r) for use in k+(r*n) begins with the processing system selecting or otherwise determining, at step, 602, a number of bits (m) for use in representing the order (n) as a binary value. At step 604, the processing system selects or determines a number of bits (j) for use in representing k+r*n as a binary value. At step 606, the processing system determines a lower end ($R_L$) of a range of values for constraining (r) where: $R_L$=floor(mrecip*2(j−m−1))+1) and where, as explained, mrecip is an approximate reciprocal of the order (n) of the base point (P). At step 608, the processing system determines an upper end ($R_U$) of the range of values for constraining (r) where: $R_U$=floor(mrecip*2(j−m−1))−2). At step 610, the processing system randomly or pseudorandomly generates r from within the range: $R_L$ . . . $R_U$. The value of r is then used to generate k'=k+(r*n).

Figure 7:
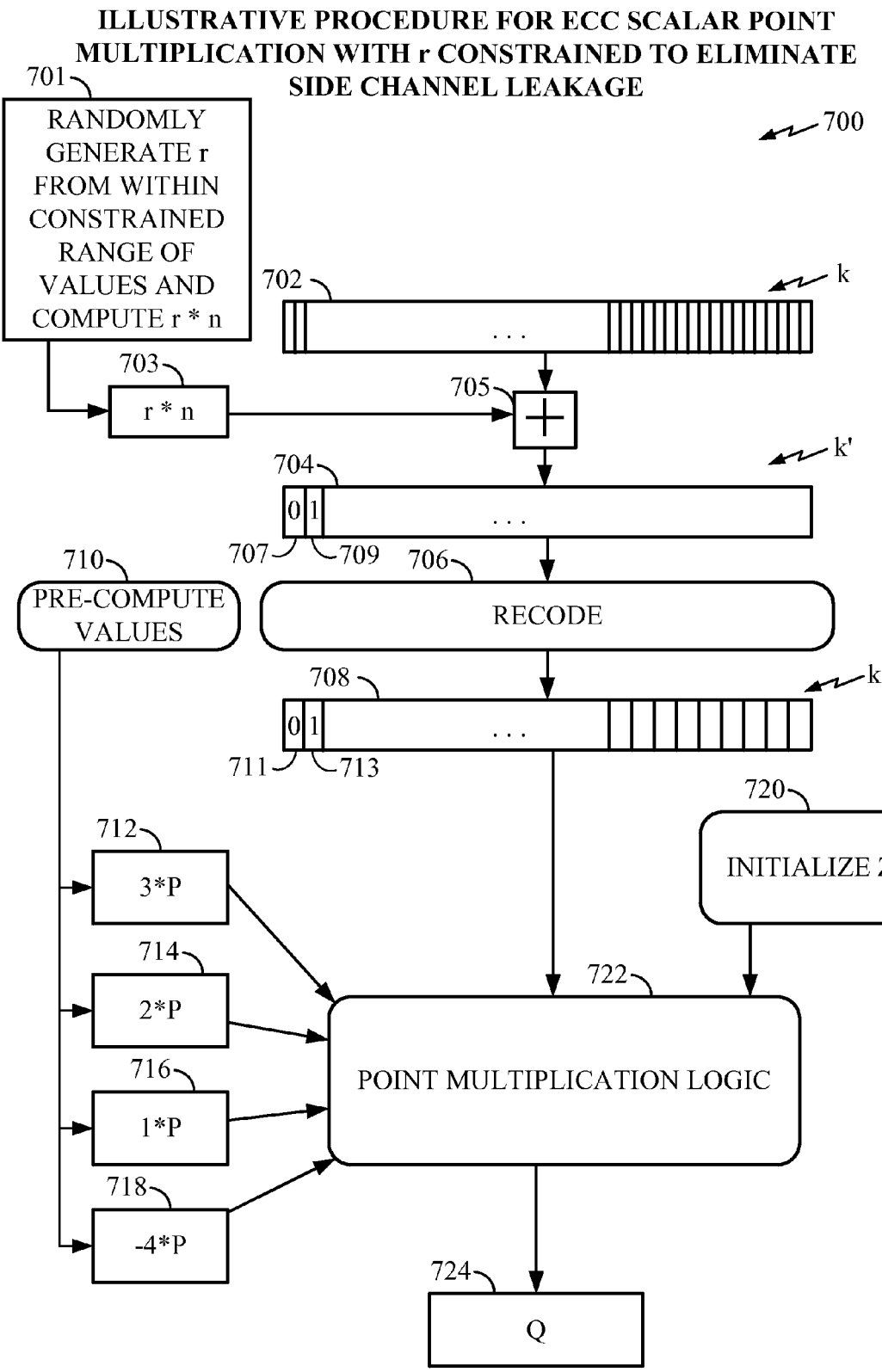
FIG. 7 further illustrates still aspects of the exemplary procedure of FIG. 5.

FIG. 7 further illustrates the procedure of FIGS. 5-6. The procedure 700 of FIG. 7 begins at 701 where the random multiplier r is randomly generated from within the aforementioned constrained range of values and r*n is then computed. That is, r is randomly or pseudorandomly obtained from within the range: floor(mrecip*$2^{(j-m-1)}$)+1 . . . floor(mrecip*$2^{(j-m)}$)−2. To facilitate this, the value of mrecip may be pre-computed. The resulting binary value r*n is stored at 703. Input string 702 corresponds to bit string k. The values for k and r*n are added at block 705 to yield string k'=k+r*n, which may again be regarded as a base 4 string by grouping pairs of bits. However, by virtue of constraining or restricting r as described, the most significant bit of k' is even and fixed for a particular elliptic curve. Indeed, as shown, the two most significant bits 707 and 709 are 0 and 1, respectively. Thereafter, processing may proceed as generally described above in connection with FIG. 4 with string k' recoded to yield a string k". Again, however, by virtue of constraining r, the most significant bit of k" is likewise even and fixed for a particular elliptic curve and, as shown, the two most significant bits 711 and 713 are 0 and 1. String k" is then used to generate Q 724 from an initialized Z value 720 using point multiplication logic 722 based on four values (3*P, 2*P, 1*P and −4*P) pre-computed at 710 and stored at blocks 712, 714, 716 and 718.

Since the sequence of basic EC point multiplication logic operations are double, double, add, (for a fixed number of cycles for any particular ECC curve), the procedure of FIG. 7 makes simple power analysis and timing attacks difficult. As noted above, simple power analysis might be combined with signal averaging to extract more information but this is frustrated by almost every trace having a different k' value. It is again noted that in some ECC procedures, introducing a random value can facilitate differential power analysis that is doubtful here since an attacker would not know r.

Exemplary Apparatus, Systems and Methods

Figure 8:
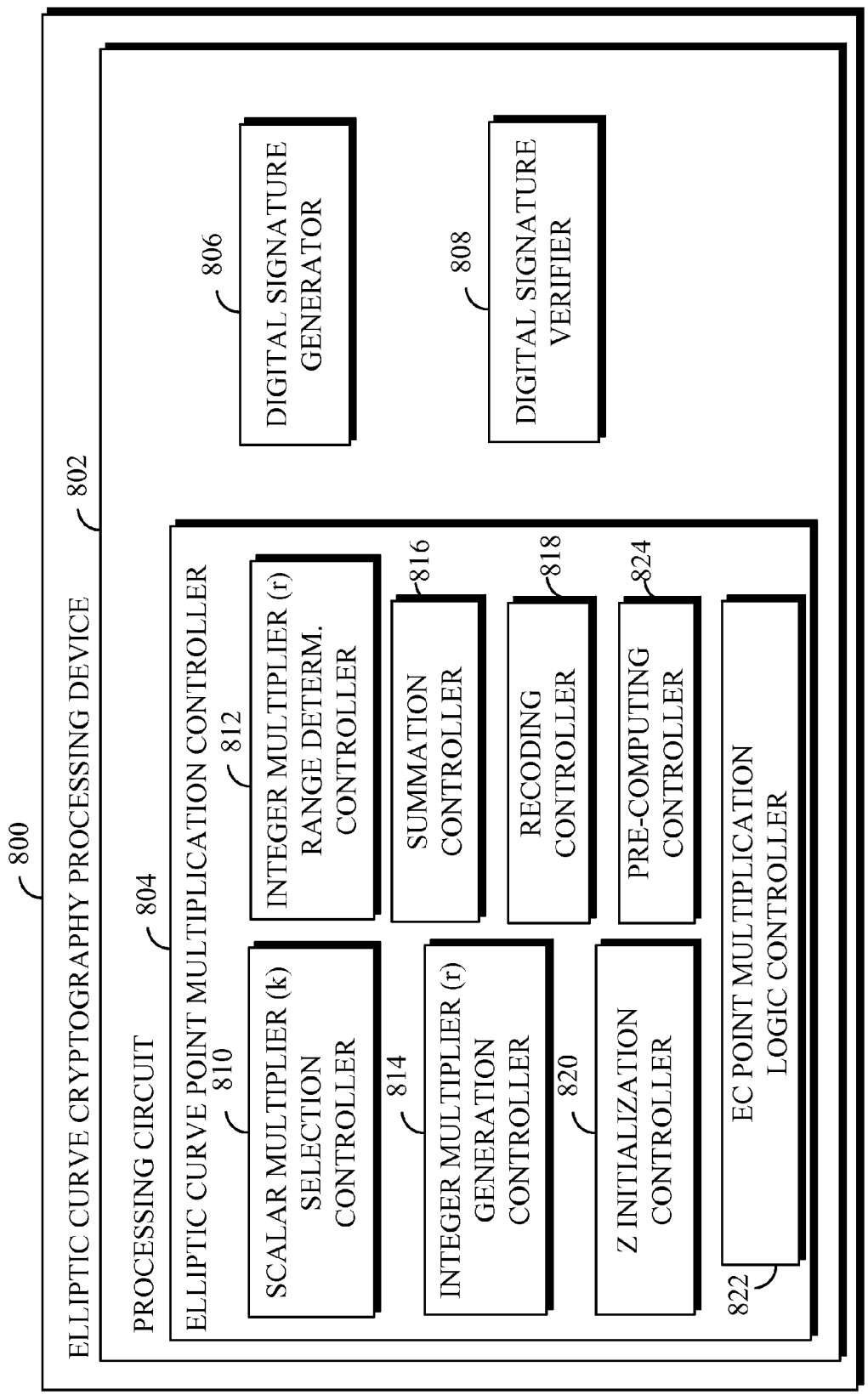
FIG. 8 illustrates an exemplary ECC processing device employing components that reduce or substantially eliminate certain kinds of side-channel attacks.

FIG. 8 illustrates an exemplary elliptic curve cryptography (ECC) processing device 800 having a processing circuit 802 providing an EC point multiplication controller 804, a digital signature generator 806, from which at least one digital signature may be obtained, and a digital signature verifier 808. In this example, EC point multiplication controller 804 includes a scalar multiplier (k) selection controller operative to obtain a scalar multiplier (k) of a base point (P) of order (n) on an elliptic curve for use with an EC point multiplication procedure operating on values represented as a series of bits. A integer multiplier (r) range determination controller 812 is operative to determine a range of values for the integer multiplier (r) restricted so that, regardless of the particular value of (r) obtained within the range, EC point multiplication procedures performed using the scalar multiplier (k) summed with a product of the integer multiplier (r) and the order (n) consume processing resources independent of the value of the scalar multiplier (k). Range determination controller 812 may operate to: determine a lower end ($R_L$) of the range of values by determining $R_L$=floor(mrecip*$2^{(j-m-1))}$+1) wherein mrecip is an approximate reciprocal of n, m is a number of bits in a value representing n, j is a number of bits in a value representing k+(r*n); and also determine an upper end ($R_U$) of the range of values by determining $R_U$=floor(mrecip*$2^{(j-m)}$–2), as already explained. A integer multiplier (r) generation controller 814 is operative to obtain a integer multiplier (r) so that EC point multiplication procedures performed using the scalar multiplier (k) summed with a product of the integer multiplier (r) and the order (n) consume processing resources independent of the value of the scalar multiplier (k), which may be accomplished by randomly or pseudorandomly selecting a value r from within the range of values determined by range determination controller 812.

A summation controller 816 is operative to apply the integer multiplier (r) to the order (n) to yield the product (r*n) of the integer multiplier (r) and the order (n) and then to sum the scalar multiplier (k) and the product of the integer multiplier (r) and the order (n) to yield the sum of the scalar multiplier (k) with the product of the integer multiplier (r) and the order (n), e.g., k+r*n. A recoding controller 818 is then operative to recode the scalar multiplier (k) summed with the product of the integer multiplier (r) and the order (n) to yield a recoded value, e.g., to recode k+r*n. Recoding may be performed, for example, as shown in block 306 of FIG. 3 and described above but using k+r*n where r is constrained such that, regardless of the particular value of (r) chosen, the bit position of the most significant bit of k+r*n is even and fixed for a particular elliptic curve during recoding. As such, recoding operations should not exhibit any side-channel leakage at least insofar as time and power are concerned. A Z initialization controller 820 is operative to initially set a scalar value Z for use with an EC point multiplication logic controller 822, as discussed above. A pre-computing controller 824 is operative to pre-compute values based on P for use in processing Z based on the recoded value using EC point multiplication logic controller 822. For example, pre-computing controller 824 may pre-compute values for –4*P, 1*P, 2*P and 3*P as shown in FIG. 7 and discussed above. The pre-computing controller may also pre-compute the value of mrecip for use by range determination controller 812. EC point multiplication logic controller 822 may then apply the pre-computed values based on P (obtained from the pre-computing controller) to process the value Z (obtained from Z initialization controller) based on the value of the recoded sum k+r*n (obtained from the recoding controller) to yield an output value Q. The generation of Q may be performed, for example, generally as shown in block 322 of FIG. 3 and described above, though based on recoded values where, again, the bit position of the most significant bit is even and fixed for a particular elliptic curve.

Digital signature generator 806 and digital signature verifier 808 may generate and/or verify digital signatures based, at least in part, on k, P and Q values generated or otherwise obtained by EC point multiplication controller 804, or by using other values generated or otherwise obtained by the EC point multiplication controller. In some examples, the digital signature generator and the digital signature verifier may utilize or incorporate some of the components of EC point multiplication controller such as EC point multiply logic controller 822 and may use some of the values pre-computed by pre-computing controller 824.

Accordingly, the processing device 800, and its various components, provide: a means for obtaining a scalar multiplier (k) of a base point (P) of order (n) on an elliptic curve for use with an elliptic curve point multiplication procedure operating on values represented as a series of bits; a means for determining a range of values so that, regardless of a particular value of (r) obtained within the range, elliptic curve point multiplication procedures performed using the scalar multiplier (k) summed with a product of the integer multiplier (r) and the order (n) consume device resources independent of the value of the scalar multiplier (k); a means for obtaining an integer multiplier (r) from within the range of values; and a means for performing at least one elliptic curve point multiplication procedure using the scalar multiplier (k), the integer multiplier (r) and the order (n). The processing device 800 also provides a means for determining a range of values for the integer multiplier (r) restricted so that, regardless of the particular value of (r) obtained within the range, the bit position of the most significant bit of the scalar multiplier (k) summed with the product of the integer multiplier (r) and the order (n) is even and fixed for a particular elliptic curve.

Figure 9:
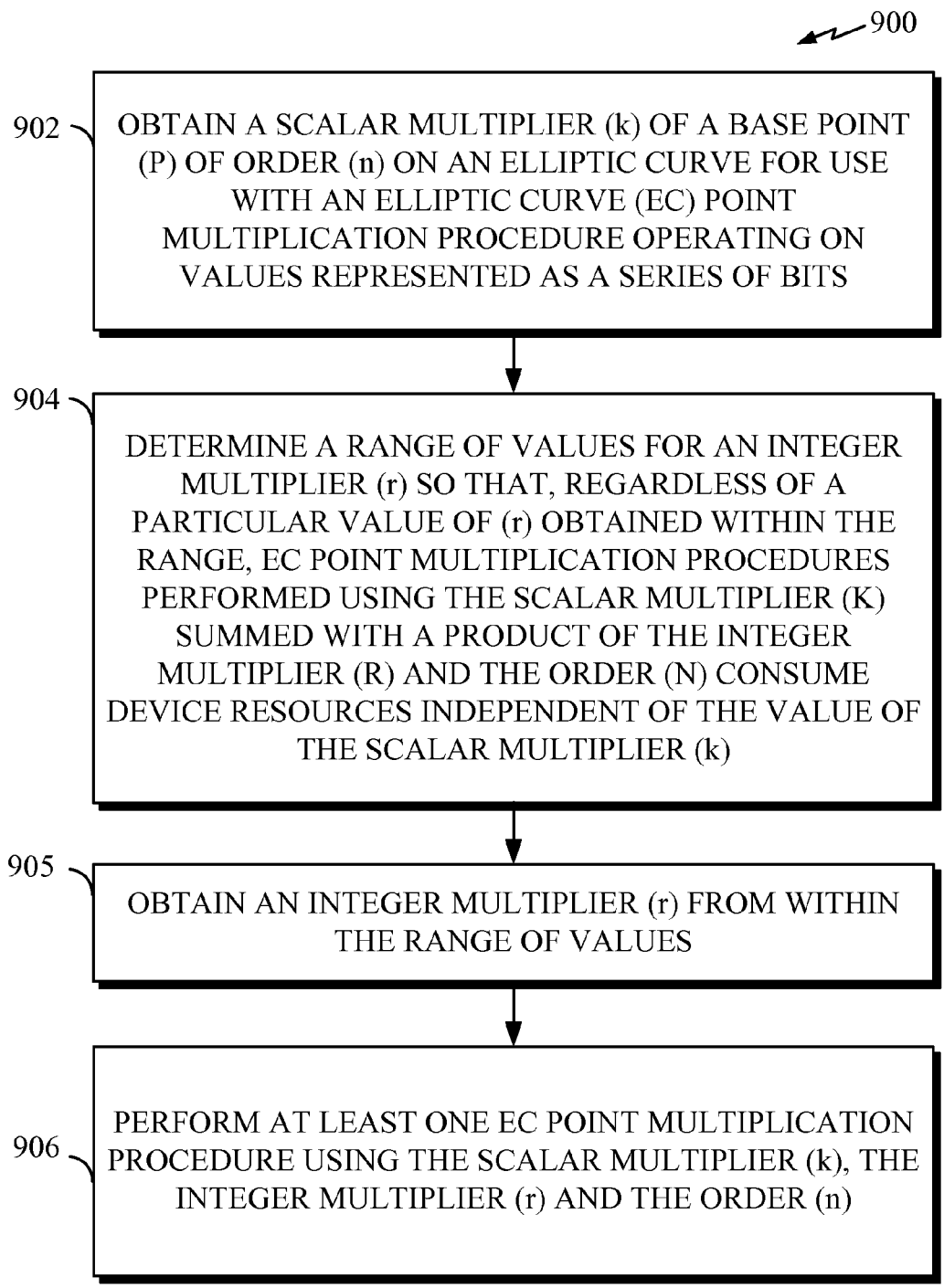
FIG. 9 summarizes exemplary procedures for use with the device of FIG. 8.

FIG. 9 illustrates methods or procedures 900 that may be performed by ECC processing device 800 of FIG. 8 or other suitably equipped devices. At step 902, a scalar multiplier (k) of a base point (P) of order (n) on an elliptic curve is obtained for use with an EC point multiplication procedure operating on values represented as a series of bits. At step 904, a range of values for an integer multiplier (r) is determined so that, regardless of a particular value of (r) obtained within the range, EC point multiplication procedures performed using the scalar multiplier (k) summed with a product of the integer multiplier (r) and the order (n) consume device resources independent of the value of the scalar multiplier (k). At step 905, an integer multiplier (r) is obtained from within the range of values. At step 906, at least one EC point multiplication procedure is performed using the scalar multiplier (k), the integer multiplier (r) and the order (n).

Figure 10:
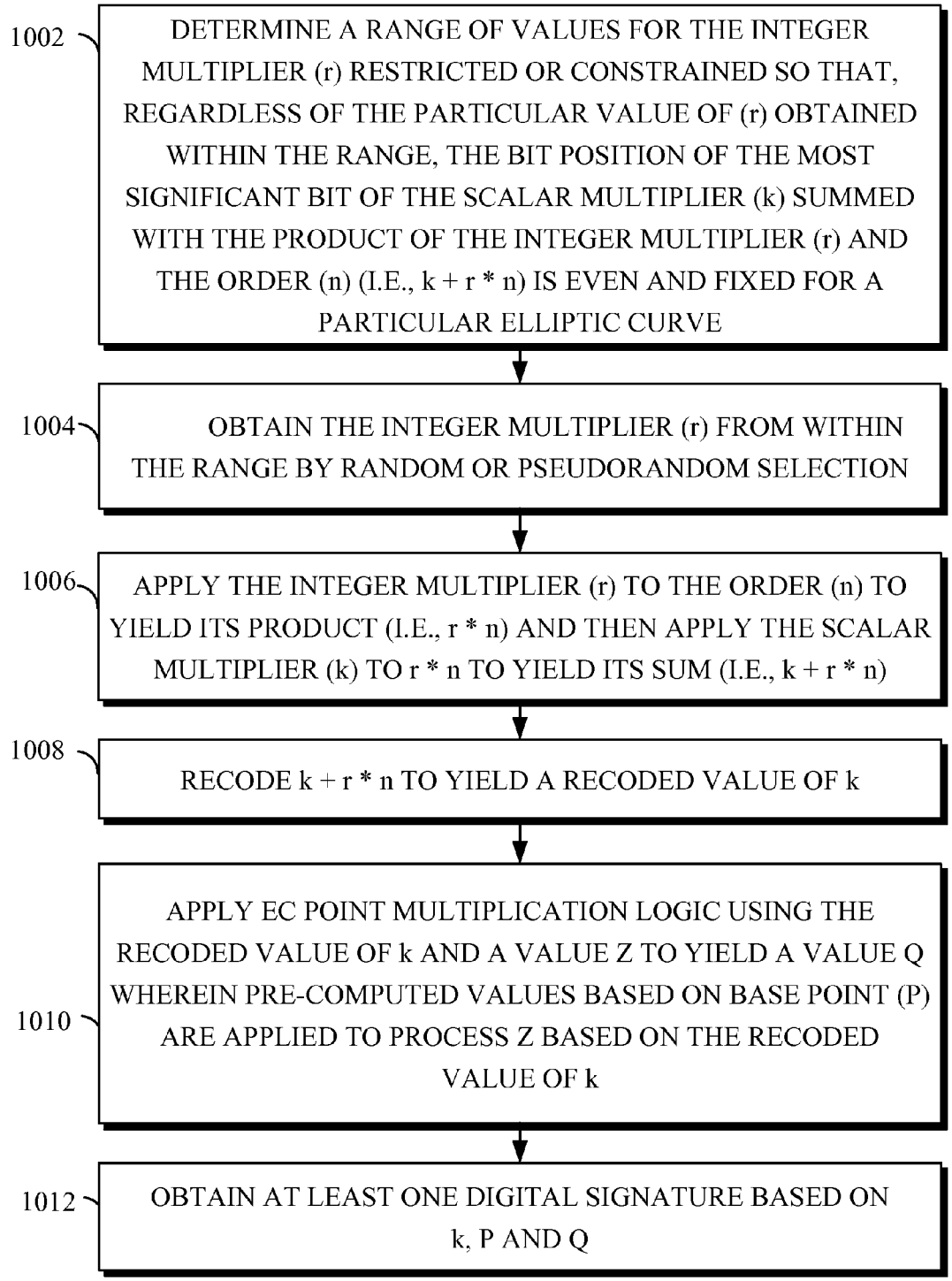
FIG. 10 provides additional exemplary procedures for use with the device of FIG. 8.

FIG. 10 illustrates additional methods or procedures 1000 that may be performed by ECC processing device 800 of FIG. 8 or other suitably equipped devices. In this example, at step 1002, a range of values is determined for the integer multiplier (r) that is restricted or constrained so that, regardless of the particular value of (r) obtained within the range, the bit position of the most significant bit of the scalar multiplier (k) summed with the product of the integer multiplier (r) and the order (n) (i.e. k+r*n) is even and fixed for a particular elliptic curve. At step 1004, the integer multiplier (r) is selected or otherwise obtained from within the range by random or pseudorandom selection. At step 1006, the integer multiplier (r) is applied to the order (n) to yield its product (i.e., r*n) and then the scalar multiplier (k) is applied to r*n to yield its sum (i.e., k+r*n). Stated differently, at step 1006, the integer multiplier (r) is applied to the order (n) to yield the product (r*n) of the integer multiplier (r) and the order (n) and then the scalar multiplier (k) is applied to the product of the integer multiplier (r) and the order (n) to yield the sum (i.e., k+r*n) of the scalar multiplier (k) with the product of the integer multiplier (r) and the order (n). At step 1008, k+r*n is recoded to yield a recoded value of k. Stated differently, at step 1008, the scalar multiplier (k) summed with the product of the integer multiplier (r) and the order (n) is recoded to yield a recoded value. At step 1010, EC point multiplication logic is applied using the recoded value and a value Z to yield a value Q wherein pre-computed values based on base point (P) are applied to process Z based on the recoded value of k. At step, 1012, at least one digital signature is obtained based on k, P and Q.

Figure 11:
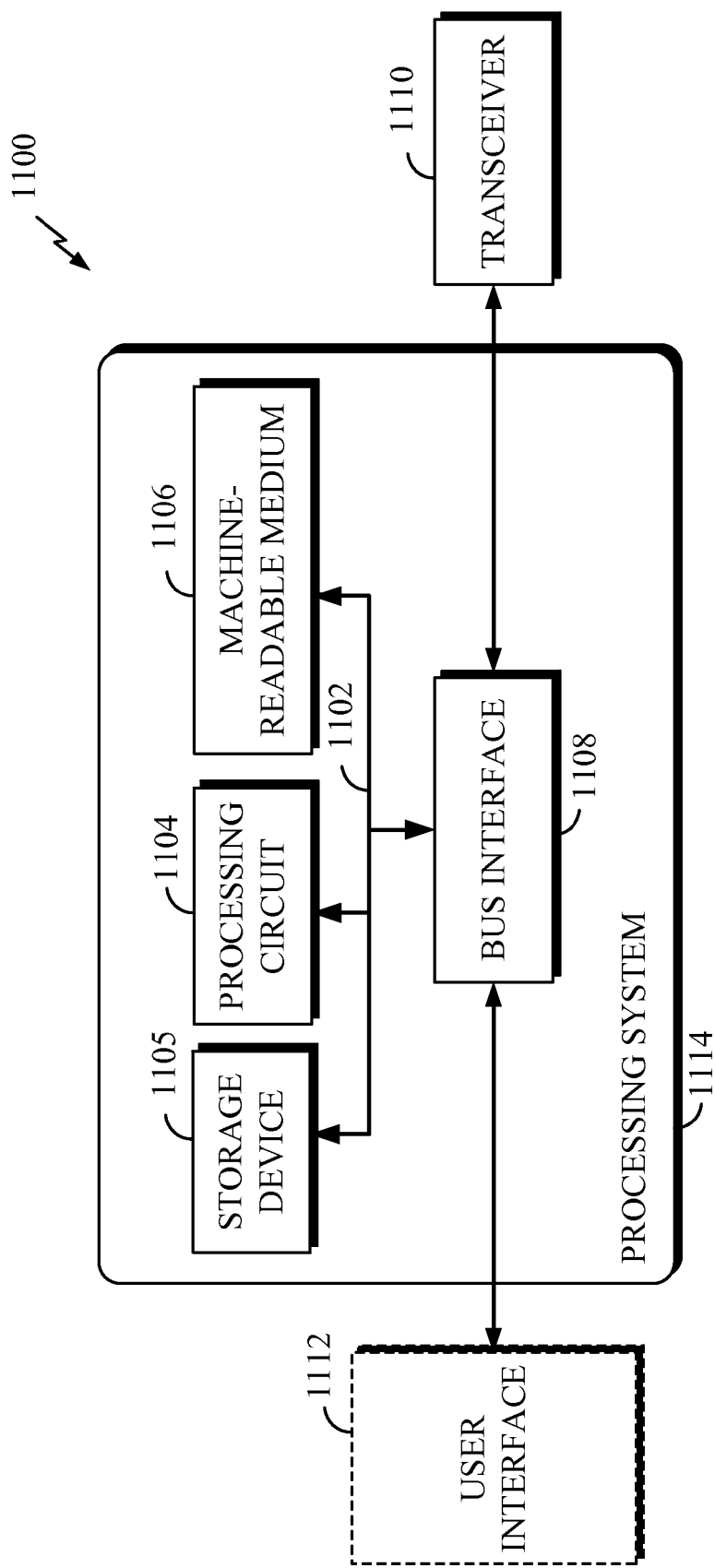
FIG. 11 illustrates an exemplary processing system in which components of the various systems and devices of FIGS. 1-10 may be incorporated.

FIG. 11 illustrates an overall system or apparatus 1100 in which the components and methods of FIGS. 1-10 may be implemented. In accordance with various aspects of the disclosure, an element, or any portion of an element, or any combination of elements may be implemented with a processing system 1114 that includes one or more processing circuits 1104 such as the processing circuit of FIG. 8. For example, apparatus 1100 may be a component of a transaction server connected to the Internet or may be component of a wireless device (e.g. a user equipment (UE) or tablet computer) of a mobile communication system. Examples of processing circuits 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, processing circuits 1104, as utilized in apparatus 1100, may be used to implement any one or more of the processes described above and illustrated in FIGS. 3-7 and/or 9-10, such as processes to generate or verify a digital signature. In particular, processing circuit 1104 may be configured to: obtain a scalar multiplier (k) of a base point (P) of order (n) on an elliptic curve for use with an elliptic curve point multiplication procedure operating on values represented as a series of bits; obtain a integer multiplier (r) from a range of values set so that, regardless of the particular value of (r) obtained within the range, elliptic curve point multiplication procedures performed using the scalar multiplier (k) summed with a product of the integer multiplier (r) and the order (n) consume processing resources independent of the value of the scalar multiplier (k); and perform at least one elliptic curve point multiplication procedure using the scalar multiplier (k), the integer multiplier (r) and the order (n).

In the example of FIG. 11, processing system 1114 may be implemented with a bus architecture, represented generally by the bus 1102. Bus 1102 may include any number of interconnecting buses and bridges depending on the specific application of processing system 1114 and the overall design constraints. Bus 1102 links various circuits including one or more processing circuits (represented generally by the processing circuits 1104), memory storage device 1105, and machine-readable medium or computer-readable medium (generally represented by machine-readable 1106.) Bus 1102 may also link various other circuits such as timing sources, peripherals, voltage regulators, and power management circuits, which are well known in the art, and therefore, will not be described any further. Bus interface 1108 provides an interface between bus 1102 and a transceiver 1110. Transceiver 1110 provides a means for communicating with various other apparatus over a transmission medium. Depending upon the nature of the apparatus, a user interface 1112 (e.g., keypad, display, speaker, microphone, joystick) may also be provided.

Processor or processing circuit 1104 is responsible for managing bus 1102 and general processing, including the execution of software stored on the machine-readable medium 1106. The software, when executed by processor 1104, causes processing system 1114 to perform the various functions described herein for any particular apparatus. Machine-readable medium 1106 may also be used for storing data that is manipulated by processor 1104 when executing software. In particular, machine-readable storage medium 1106 may have one or more instructions which when executed by processing circuit 1104 causes processing circuit 1104 to: obtain a scalar multiplier (k) of a base point (P) of order (n) on an elliptic curve for use with an elliptic curve point multiplication procedure operating on values represented as a series of bits; determine a range of values so that, regardless of a particular value of (r) obtained within the range, elliptic curve point multiplication procedures performed using the scalar multiplier (k) summed with a product of the integer multiplier (r) and the order (n) consume processing resources independent of the value of the scalar multiplier (k); obtain a integer multiplier (r) from within the rage of values; and perform at least one elliptic curve point multiplication procedure using the scalar multiplier (k), the integer multiplier (r) and the order (n).

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The software may reside on computer-readable or machine-readable medium 1106. As noted, machine-readable medium 1106 may be a non-transitory machine-readable medium. A non-transitory machine-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), random access memory (RAM), read only memory (ROM), a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a computer. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices. The machine-readable medium may also include, by way of example, a carrier wave, a transmission line, and any other suitable medium for transmitting software and/or instructions that may be accessed and read by a computer. Machine-readable medium 1106 may reside in processing system 1114, external to processing system 1114, or distributed across multiple entities including processing system 1114. Machine-readable medium 1106 may be embodied in a computer program product. By way of example, a computer program product may include a machine-readable medium in packaging materials. Those skilled in the art will recognize how best to implement the described functionality presented in this disclosure depending on the particular application and the overall design constraints imposed on the overall system.

One or more of the components, steps, features, and/or functions illustrated in the figures may be rearranged and/or combined into a single component, step, feature or function or embodied in several components, steps, or functions. Additional elements, components, steps, and/or functions may also be added without departing from the disclosure. The apparatus, devices, and/or components illustrated in the figures may be configured to perform one or more of the methods, features, or steps described in the figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

Hence, in one aspect of the disclosure, the processing circuit illustrated in, e.g., FIG. 8 may be a specialized processor (e.g., an ASIC)) that is specifically designed and/or hard-wired to perform the algorithms, methods, and/or steps described in FIGS. 3-7 and/or 10-11. Thus, such a specialized processor (e.g., ASIC) may be one example of a means for executing the algorithms, methods, and/or steps described in FIGS. 3-7 and/or 10-11. The machine-readable storage medium may store instructions that when executed by a specialized processor (e.g., ASIC) causes the specialized processor to perform the algorithms, methods, and/or steps described herein.

Also, it is noted that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for elliptic curve point multiplication operable by a device, comprising:
    obtaining a scalar multiplier (k) of a base point (P) of order (n) on an elliptic curve for use with an elliptic curve point multiplication procedure operating on values represented as a series of bits;
    determining a range of values for an integer multiplier (r) sufficient to ensure that, regardless of a particular value of the integer multiplier (r) obtained within the range of values, elliptic curve point multiplication procedures performed by the device using the scalar multiplier (k) summed with a product of the integer multiplier (r) and the order (n) consume one or more resources of the device independent of the value of the scalar multiplier (k);
    obtaining an integer multiplier (r) from within the range of values; and
    performing at least one elliptic curve point multiplication procedure using the scalar multiplier (k), the integer multiplier (r) and the order (n) while consuming the one or more resources of the device independent of the value of the scalar multiplier (k).

2. The method of claim 1, wherein determining the range of values for the integer multiplier (r) comprises determining the range of values sufficient to ensure that, regardless of the particular value of the integer multiplier (r) obtained within the range of values, a bit position of a most significant bit of the scalar multiplier (k) summed with the product of the integer multiplier (r) and the order (n) is even and fixed for a particular elliptic curve.

3. The method of claim 2, wherein determining the range of values for the integer multiplier (r) comprises:
    determining a lower end ($R_L$) of the range of values by determining $R_L = \text{floor}(\text{mrecip} * 2^{(j-m-1)}) + 1$ wherein mrecip is an approximate reciprocal of the order (n), m is a number of bits in a value representing the order (n), j is a number of bits in a value (k+(r×n)) representing a sum of the scalar multiplier (k) with the product of the integer multiplier (r) and the order (n); and
    determining an upper end ($R_U$) of the range of values by determining $R_U = \text{floor}(\text{mrecip} * 2^{(j-m)}) - 2$.

4. The method of claim 1, wherein obtaining the integer multiplier (r) from within the range of values is performed using one or more of random and pseudorandom selection.

5. The method of claim 1, further comprising recoding the scalar multiplier (k) summed with the product of the integer multiplier (r) and the order (n) to yield a recoded value.

6. The method of claim 5, further comprising applying elliptic curve point multiplication logic using the recoded value and a value Z by applying pre-computed values based on P to process Z based on the recoded value.

7. A device comprising:
processing circuit configured to:
obtain a scalar multiplier (k) of a base point (P) of order (n) on an elliptic curve for use with an elliptic curve point multiplication procedure operating on values represented as a series of bits;
determine a range of values for an integer multiplier (r) sufficient to ensure that, regardless of a particular value of the integer multiplier (r) obtained within the range of values, elliptic curve point multiplication procedures performed by the device using the scalar multiplier (k) summed with a product of the integer multiplier (r) and the order (n) consume one or more resources of the device independent of the value of the scalar multiplier (k);
obtain an integer multiplier (r) from within the range of values; and
perform at least one elliptic curve point multiplication procedure using the scalar multiplier (k), the integer multiplier (r) and the order (n) while consuming the one or more resources of the device independent of the value of the scalar multiplier (k).

8. The device of claim 7, wherein the processing circuit is further configured to determine the range of values for the integer multiplier (r) sufficient to ensure that, regardless of the particular value of the integer multiplier (r) obtained within the range of values, a bit position of a most significant bit of the scalar multiplier (k) summed with the product of the integer multiplier (r) and the order (n) is even and fixed for a particular elliptic curve.

9. The device of claim 8, wherein the processing circuit is configured to determine the range of values for the integer multiplier (r) by:
determining a lower end ($R_L$) of the range of values by determining $R_L=\text{floor}(\text{mrecip}*2^{(j-m-1)})+1)$ wherein mrecip is an approximate reciprocal of the order (n), m is a number of bits in a value representing the order (n), j is a number of bits in a value (k+(r×n)) representing a sum of the scalar multiplier (k) with the product of the integer multiplier (r) and the order (n); and
determining an upper end ($R_U$) of the range of values by determining $R_U=\text{floor}(\text{mrecip}*2^{(j-m)}-2)$.

10. The device of claim 7, wherein processing circuit is further configured to obtain the integer multiplier (r) from within the range of values using one or more of random and pseudorandom selection.

11. The device of claim 7, wherein processing circuit is further configured to recode the scalar multiplier (k) summed with the product of the integer multiplier (r) and the order (n) to yield a recoded value.

12. The device of claim 11, wherein processing circuit is further configured to apply elliptic curve point multiplication logic using the recoded value and a value Z by applying pre-computed values based on P to process Z based on the recoded value.

13. A device comprising:
means for obtaining a scalar multiplier (k) of a base point (P) of order (n) on an elliptic curve for use with an elliptic curve point multiplication procedure operating on values represented as a series of bits;
means for determining a range of values for an integer multiplier (r) sufficient to ensure that, regardless of a particular value of the integer multiplier (r) obtained within the range of values, elliptic curve point multiplication procedures performed by the device using the scalar multiplier (k) summed with a product of the integer multiplier (r) and the order (n) consume one or more resources of the device independent of the value of the scalar multiplier (k);
means for obtaining an integer multiplier (r) from within the range of values; and
means for performing at least one elliptic curve point multiplication procedure using the scalar multiplier (k), the integer multiplier (r) and the order (n) while consuming the one or more resources of the device independent of the value of the scalar multiplier (k).

14. The device of claim 13, wherein the means for determining the range of values for the integer multiplier (r) comprises means for determining the range of values sufficient to ensure that, regardless of the particular value of the integer multiplier (r) obtained within the range of values, a bit position of a most significant bit of the scalar multiplier (k) summed with the product of the integer multiplier (r) and the order (n) is even and fixed for a particular elliptic curve.

15. The device of claim 14, wherein the means for determining the range of values for the integer multiplier (r) comprises:
means for determining a lower end ($R_L$) of the range of values by determining $R_L=\text{floor}(\text{mrecip}*2^{(j-m-1)})+1)$ wherein mrecip is an approximate reciprocal of the order (n), m is a number of bits in a value representing the order (n), j is a number of bits in a value (k+(r×n)) representing a sum of the scalar multiplier (k) with the product of the integer multiplier (r) and the order (n); and
means for determining an upper end ($R_U$) of the range of values by determining $R_U=\text{floor}(\text{mrecip}*2^{(j-m)}-2)$.

16. The device of claim 13, wherein the means for obtaining the integer multiplier (r) from within the range of values includes means for performing one or more of random and pseudorandom selection.

17. The device of claim 13, further comprising means for recoding the scalar multiplier (k) summed with the product of the integer multiplier (r) and the order (n) to yield a recoded value.

18. The device of claim 17, further comprising means for applying elliptic curve point multiplication logic using the recoded value and a value Z by applying pre-computed values based on P to process Z based on the recoded value.

19. A non-transitory machine-readable storage medium having one or more instructions which when executed by at least one processing circuit causes the at least one processing circuit to:
obtain a scalar multiplier (k) of a base point (P) of order (n) on an elliptic curve for use with an elliptic curve point multiplication procedure operating on values represented as a series of bits;
determine a range of values for an integer multiplier (r) sufficient to ensure that, regardless of a particular value of the integer multiplier (r) obtained within the range of values, elliptic curve point multiplication procedures performed by the device using the scalar multiplier (k) summed with a product of the integer multiplier (r) and the order (n) consume one or more resources of the device independent of the value of the scalar multiplier (k);
obtain an integer multiplier (r) from within the range of values; and
perform at least one elliptic curve point multiplication procedure using the scalar multiplier (k), the integer multiplier (r) and the order (n) while consuming the one or more resources of the device independent of the value of the scalar multiplier (k).

20. The non-transitory machine-readable storage medium of claim 19, further comprising instructions to cause the processing circuit to determine the range of values for the integer multiplier (r) sufficient to ensure that, regardless of the particular value of the integer multiplier (r) obtained within the range of values, a bit position of a most significant bit of the scalar multiplier (k) summed with the product of the integer multiplier (r) and the order (n) is even and fixed for a particular elliptic curve.

21. The non-transitory machine-readable storage medium of claim 20, further comprising instructions to cause the processing circuit to determine the range of values for the integer multiplier (r) by:

determining a lower end ($R_L$) of the range of values by determining $R_L$=floor(mrecip*$2^{(j-m-1))}$+1) wherein mrecip is an approximate reciprocal of the order (n), m is a number of bits in a value representing the order (n), j is a number of bits in a value (k+(r×n)) representing a sum of the scalar multiplier (k) with the product of the integer multiplier (r) and the order (n); and determining an upper end ($R_U$) of the range of values by determining $R_U$=floor(mrecip*$2^{(j-m)}$-2).

22. The non-transitory machine-readable storage medium of claim 19, further comprising instructions to cause the processing circuit to obtain the integer multiplier (r) from within the range of values using one or more of random and pseudorandom selection.

23. The non-transitory machine-readable storage medium of claim 19, further comprising instructions to cause the processing circuit to recode the scalar multiplier (k) summed with the product of the integer multiplier (r) and the order (n) to yield a recoded value.

24. The non-transitory machine-readable storage medium of claim 23, further comprising instructions to cause the processing circuit to apply elliptic curve point multiplication logic using the recoded value and a value Z by applying pre-computed values based on P to process Z based on the recoded value.

25. The device of claim 7, wherein the processing circuit includes a scalar multiplier selection controller to obtain the scalar multiplier (k) of the base point (P) of order (n) on the elliptic curve.

26. The device of claim 7, wherein the processing circuit includes an integer multiplier range determination controller to determine the range of values for the integer multiplier (r).

27. The device of claim 7, wherein the processing circuit includes an integer multiplier generation controller to obtain the integer multiplier (r) from within the range of values using one or more of random and pseudorandom selection.

28. The device of claim 7, wherein the processing circuit includes an elliptic curve point multiplication logic controller to perform at least one elliptic curve point multiplication procedure using the scalar multiplier (k), the integer multiplier (r) and the order (n).

29. The device of claim 7, wherein the processing circuit includes a recoding controller to recode the scalar multiplier (k) summed with the product of the integer multiplier (r) and the order (n) to yield the recoded value.

30. The device of claim 7, wherein the processing circuit includes a summation controller to apply the integer multiplier (r) to the order (n) to yield a product (r*n) of the integer multiplier (r) and the order (n) and then to sum the scalar multiplier (k) and the product of the integer multiplier (r) and the order (n) to yield the sum of the scalar multiplier (k) with the product of the integer multiplier (r) and the order (n).

31. The device of claim 7, wherein the processing circuit includes a Z initialization controller to set a scalar value Z for use with the elliptic curve point multiplication.

32. The device of claim 31, wherein the processing circuit includes a pre-computing controller to pre-compute values based on P for use in processing Z based on the recoded value.

* * * * *